(12) United States Patent
Ramirez

(10) Patent No.: US 6,347,916 B1
(45) Date of Patent: Feb. 19, 2002

(54) CAP FOR PROTECTING FOUNDATION ANCHOR BOLTS

(76) Inventor: Jose G. Ramirez, P.O. Box 657, Hidalgo, TX (US) 78557

( * ) Notice: Subject to any disclaimer, the term of this patent is extended or adjusted under 35 U.S.C. 154(b) by 0 days.

(21) Appl. No.: 09/307,367

(22) Filed: May 7, 1999

Related U.S. Application Data

(60) Provisional application No. 60/084,864, filed on May 8, 1998.

(51) Int. Cl.[7] ............................................. F16B 37/14
(52) U.S. Cl. ..................................... 411/372.5; 411/908
(58) Field of Search ........................... 411/531, 533, 411/908, 910, 372.5, 373; 52/700, 707, 295

(56) References Cited

U.S. PATENT DOCUMENTS

| | | | |
|---|---|---|---|
| 936,690 A | * 10/1909 | Alford | 52/707 |
| 3,552,734 A | * 1/1971 | Severino | 269/287 |
| 4,118,910 A | * 10/1978 | Mcsherry | 52/699 |
| 4,412,407 A | * 11/1983 | Melfi | 52/699 |
| 4,614,070 A | * 9/1986 | Idland | 52/296 |
| 4,872,298 A | * 10/1989 | Klemic | 52/127.1 |
| 5,050,364 A | * 9/1991 | Johnson | 52/705 |
| 5,060,436 A | * 10/1991 | Delgado | 52/295 |
| 5,688,428 A | * 11/1997 | Maguire | 249/91 |

* cited by examiner

*Primary Examiner*—Gary Estremsky
(74) *Attorney, Agent, or Firm*—Jackson Walker LLP

(57) ABSTRACT

A protective device for foundation anchor bolts, the protective device having a crown dimensioned to enclose an exposed portion of the anchor bolt and a disc shaped base having legs depending therefrom.

1 Claim, 3 Drawing Sheets

CAP FOR PROTECTING FOUNDATION ANCHOR BOLTS

This application claims priority on Provisional Application No. 60/084,864 filed May 8, 1998.

FIELD OF THE INVENTION

Foundation anchor bolts; more specifically, a plastic cap designed to fit over a foundation anchor bolt.

SUMMARY OF THE INVENTION

Nationally recognized building codes require that all residential structures be secured to their foundation to safeguard against the destructive uplifting forces of wind and severe storms, i.e., tornadoes, hurricanes, and thunderstorms. The securing is accomplished by connecting the wood frame to the foundation through the use of steel anchor bolts embedded in the concrete foundation.

Poured concrete foundations, such as for homes or other buildings typically use anchor bolts. Anchor bolts are embedded in the foundation when the concrete is wet, with threaded portions sticking up out of the cement. When the concrete dries, the anchor bolts are used to hold down 2×4's or 2×6's which will act as a base for erecting vertical walls.

Most of the nationally recognized building codes call for the wood framing in a light framing residential structure to be secured to the foundation with ½" diameter steel anchor bolts. The anchor bolts should be long enough to be embedded into the concrete at least 6", protrude above the finished elevation of the concrete, enough to trespass the sole plate (usually a 2×4 or 2×6 laid flat), and be high enough to be secured by a round washer and a ½" nut. If these conditions are not met, then there may be an incorrect installation of the anchor bolts.

However, the bolts have to be positioned properly in the concrete so that, when the concrete dries, the anchor bolt is vertical and in its proper position, along the longitudinal axis of the sole plate. The anchor bolt cannot be too far to one side or the other of the line along which the wood, typically 2×4 or 2×6 (laid sideways) will be attached to the foundation. In other words, all the anchor bolts have to be in line. Moreover, if one anchor bolt is too high or too low, it will cause problems.

Under normal construction practices, the steel anchors, sometimes under circumstances beyond the control of the concrete installers, are not placed correctly, and end up either in a slanted position, too high, too shallow, or not centered with respect to the long edge of the sole plate. It has been noted that the steel bolts will eventually corrode as the sole plate develops at the interaction of the steel bolts, round washers, nuts, and the wooden sole plates.

When the anchor bolts end up being installed incorrectly, several consequences result. First, adjustments need to be made to either the anchor bolts or the sole plate. Second, as a result of the adjustment to either the anchor bolts or the sole plate, possible damage can result to these components. Finally, as a consequence of the damage to the anchoring components, improper installation can result on the framing of the structure. Additionally, the building inspector in charge of enforcing the local building codes may "red flag" the construction, if the damage to the anchoring components is discernable.

It can be appreciated that the anchor bolt may sometimes sink into wet concrete or fall out of a vertical orientation. Moreover, it can be appreciated that it may be easy to misplace an anchor bolt so it is not directly along a center line of all the other anchor bolts (see attached sheets).

Applicant has provided a unique anchor bolt cap which serves a number of functions to alleviate these and other problems.

BRIEF DESCRIPTION OF THE DRAWINGS

FIGS. 3, 3A, and 3B illustrate alternative embodiments of the invention.

DETAILED DESCRIPTION OF PREFERRED EMBODIMENT

Figure 1:
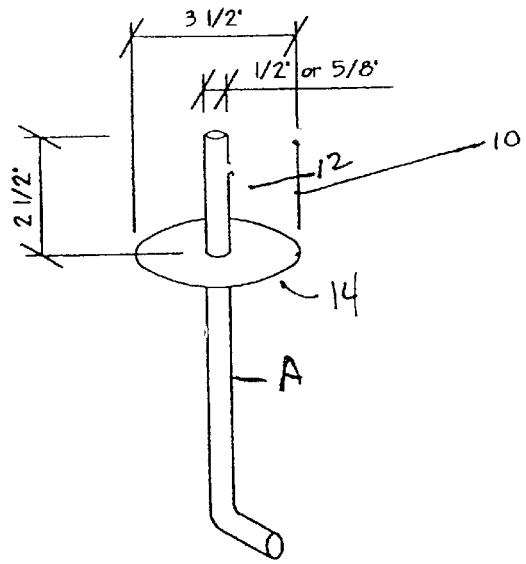
FIG. 1 is a perspective view of the invention.
Figure 2:
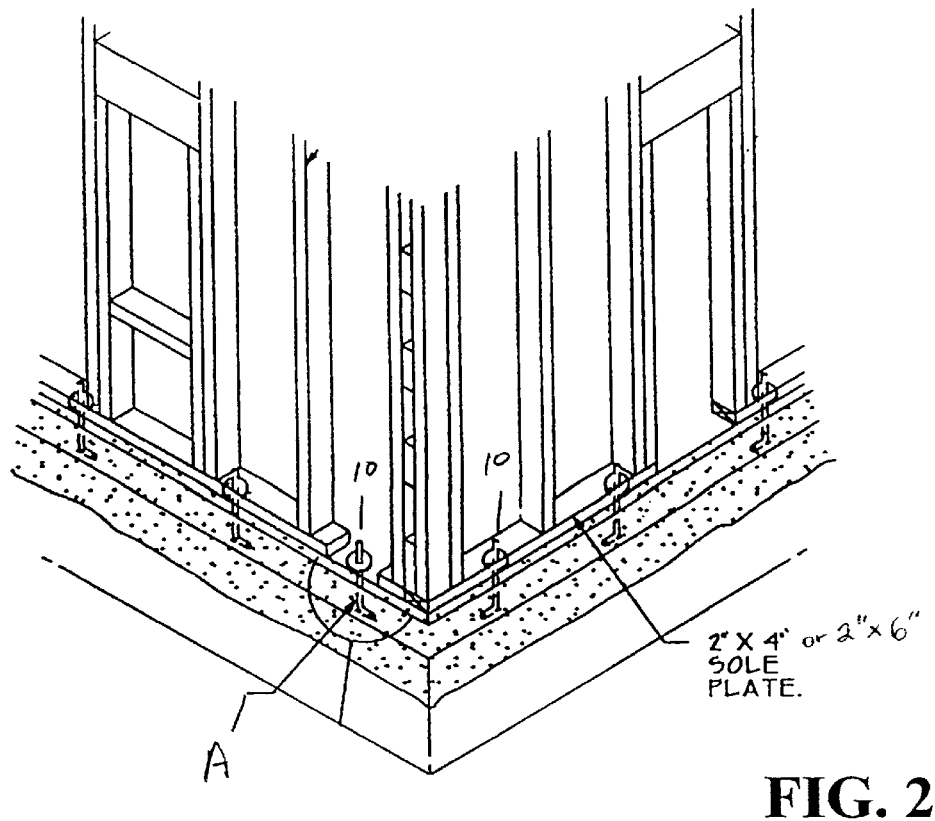
FIG. 2 is a view of the invention in an environment of intended use.

The cap 10 is illustrated in the attached FIG. 1, as well as its use (FIG. 2). As can be appreciated from the attached diagrams, the plastic anchor cap 10 looks generally like an old-fashioned stove pipe hat. It has a crown portion 12 which is cylindrical and the right diameter to fit snugly against the threaded shaft of anchor bolt A over which it is placed. Crown 12 is attached to a disk-shaped base 14. The top of the crown has a covered end portion. Thus, it is seen how the cap can be inserted over the threaded end of an anchor bolt before the anchor bolt is placed in wet cement. Further, if the dimensions are proper, the anchor cap will help maintain the anchor bolt in its proper position in wet cement, "floating" the anchor bolt on the base of the cap in the proper position vertically and longitudinally.

The length of the crown of the anchor cap should be equal to the distance that the anchor bolt shaft will extend above the concrete foundation. This is usually about 2½". The diameter of the disk base should be equal to the width of the 2×4 (typically a true 3½"), thereby allowing one to properly place the anchor bolt between two edge measurements, the distance apart being the equivalent of the width of a 2×4 which is typically used as a sole plate or baseboard to which the anchor bolt, threaded nut, and washer typically are fixed.

It can be appreciated that anchor bolt 10 will be held snugly in the cap by friction between the upper (exposed) portion of the anchor bolt (including the threaded shaft) and the inner wall of the crown. Thus, when the anchor bolts with the anchor cap firmly placed on the threaded end, bottomed to the covered portion of the crown, is placed in the wet concrete, the disk will help prevent the anchor bolt from sinking into the foundation.

After the foundation dries, the crown portion of the cap may be twisted off or cut from the disk base and removed and discarded before the 2×4 is placed down over the anchor bolt.

The cap should not be twisted off until the builder is ready to build. Sometimes a foundation will sit for months; and, if the foundation anchor bolts are not properly protected, they can become rusted. The use of Applicant's novel invention, therefore, provides rust protection.

Thus, it is seen how the use of Applicant's novel anchor bolt cap will help maintain anchor bolts in their proper position while the wet concrete is setting. Moreover, it will help protect the anchor bolts from weathering.

Applicant's anchor bolt cap has a plastic thickness ranging from 0.035" to 0.090". The plastic anchor cap has a 3½" wide base and a thickness of 6-gauge about 0.090", a 2½" high crown with a thickness of 0.050", and comes in a ½" or ⅝" wide tip. This product has three important functions in conjunction with the installation of bolts. The functions are as follows:

1. The plastic anchor cap is designed to fit tightly over the anchor bolt embedded into the concrete foundation. The 3½" base is used to keep the anchor bolt within its proper distance from the brick ledge and holds the anchor bolt straight so that the sill or sole plate (bottom plate) can be laid over it;
2. The plastic anchor cap will position the anchor bolt and maintain its proper depth embedded into the concrete and allowing a 2½" height above the foundation for the installation of the sill plate (bottom plate), nut, and a washer; and
3. The plastic anchor cap also helps prevent any corrosion due to long-term delays on foundation projects. Plastic anchor cap 10 comes in a bright orange color for quick visual contact with those involved in the projects.

FIGS. 3, 3A, 3B, and 4 illustrate an alternate preferred embodiment of Applicant's anchor cap 10. This embodiment also features a crown 12 and a base 14. It can be seen that the crown 12 has an upper portion 12A and a lower portion 12B. The distance H1 from the top surface of the base to the bottom of the upper portion is equal to the approximate true thickness of 2×4 and 2×6; typically, approximately 1½" to 1¾". The total height H2 of the crown above base 14 is typically approximately 2½" to 2¾". Therefore, the height of upper portion 12A (H2−H1) is approximately ¾" to 1¼". Anchor bolt A is intended to be threaded all the way up through the crown until it seats against covered portion 12C of the crown.

It is also seen that the inner surface of the crown may include a series of longitudinal ridges 13 (FIG. 3B) which protrude slightly into the central longitudinal cavity of the crown to allow the threads of anchor bolt A to grip the inner surface of the crown, the cap thereby being easily threaded to seat the top to the end of the anchor bolt against the inner surface of the crown as 12C.

Figure 3:
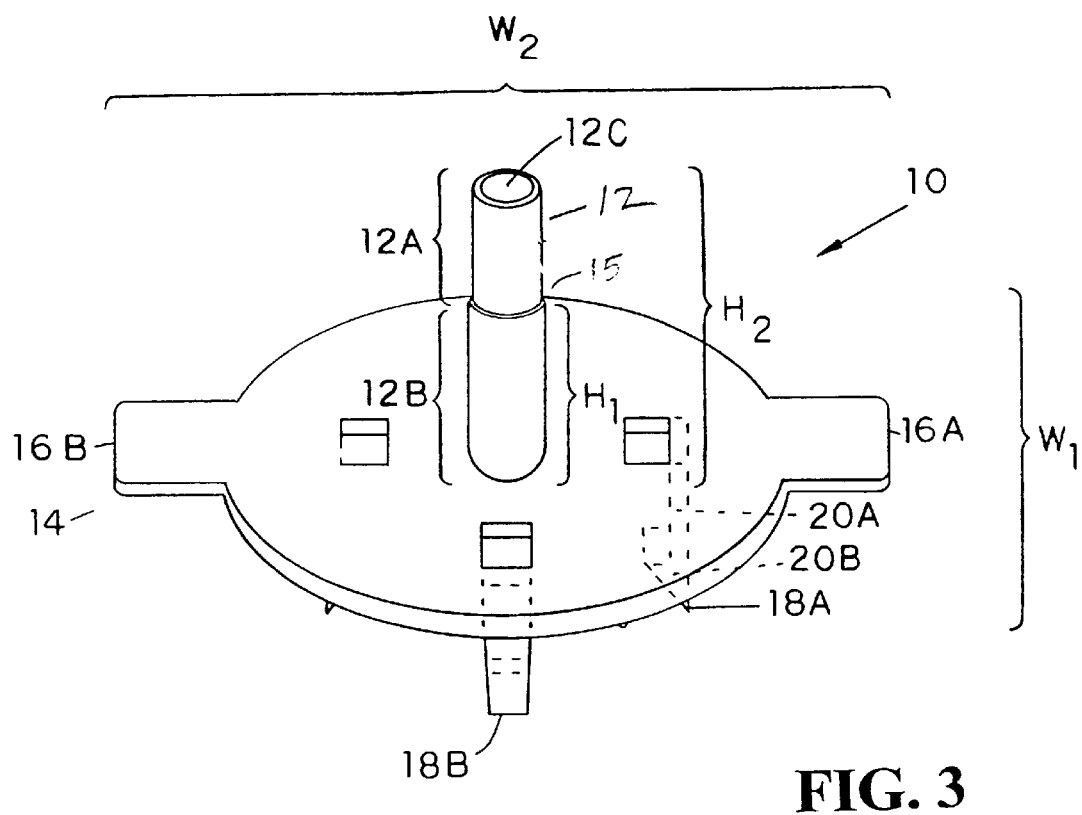
Figure 3A:
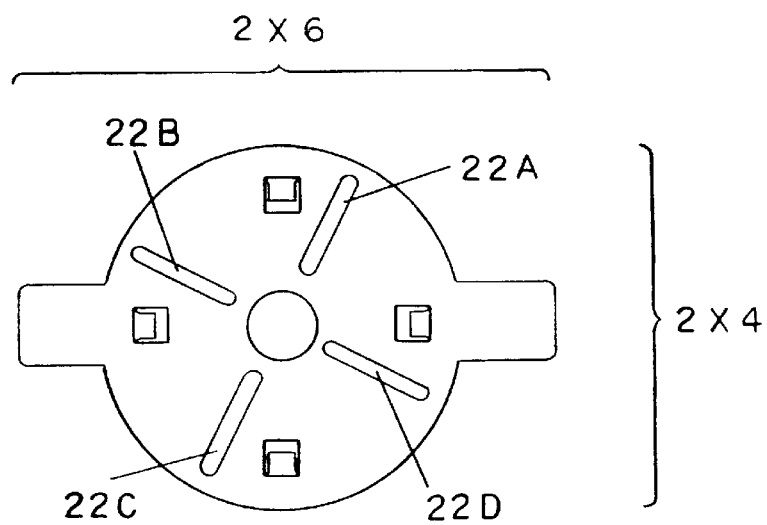
Figure 3:
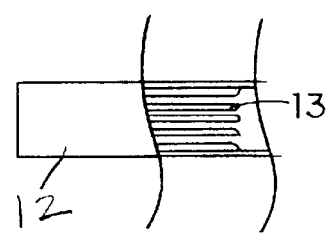

FIGS. 3, 3A, and 3B also illustrate other unique features of base 14 of Applicant's present invention. More particularly, base 14 is typically circular with a first width W1 sufficient to equal the width of a 2×4 (true width about 3½").

The base also has extended opposite to one another a pair of tabs 16A and 16B whose function is to provide a second width W2 equal to the approximate true width of a 2×6, which is typically about 5½". Thus, Applicant's unique anchor cap may be used to properly align and center the anchor bolt of a flat-laying 2×4 or 2×6 by using either the tabs 16A and 16B placed perpendicular to the axis of the 2×6 where the outer edges of the two tabs will locate the outer edges of the 2×6, and thereby center the crown or with the edges of the circular portion flush to the outer edges of a flat 2×4.

It is also seen that Applicant's unique anchor cap, as set forth in FIG. 3 also includes four legs (three shown in the illustration) which legs include an end portion 20A, which is wedge-shaped, and a shaft portion 20B. The purpose of the legs is to securely locate the anchor cap in the cement so that when the cement dries, the anchor cap cannot be easily pulled off.

FIG. 3A illustrates the underside of Applicant's anchor cap; more particularly, the use of four stiffening walls 22A through 22D to increase stiffness of the base.

FIG. 3B is a cross section of a portion of the crown showing ridges 13 on the inner surface thereof.

Figure 4:
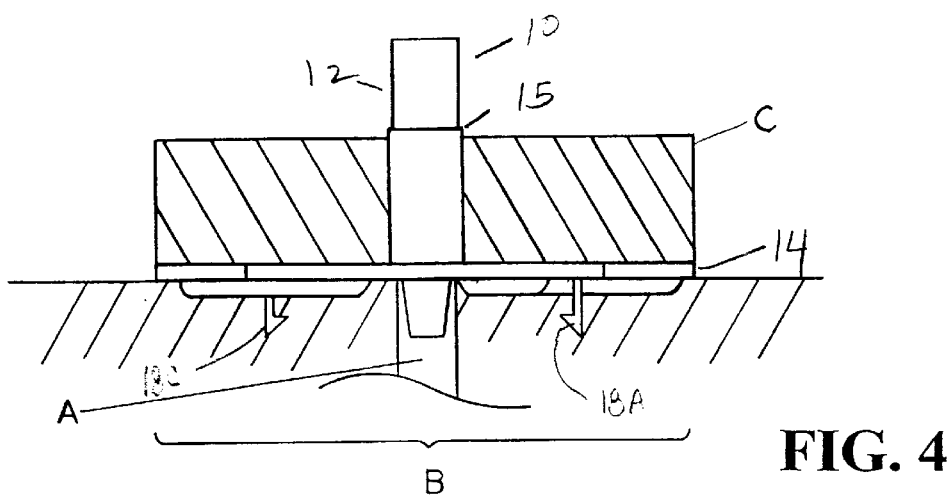
FIG. 4 illustrates an alternative embodiment of the invention.

FIG. 4 is a cross section showing the anchor cap with anchor bolt inserted therein, threaded up so that it lays with the anchor bolt projecting about 1" above the upper surface of the 2×4 or 2×6 C, illustrating how the cap protects the anchor bolt from weathering.

It is noted that shoulder 15 between upper portion 12A and lower portion 12B is typically flush with the top of the flat-laying 2×4 or 2×6 and provides an easy point for the user to cut off the upper portion of the cap after the board has been laid down, and when the washer and nut are ready to be threaded onto the anchor bolt. In fact, Applicant's lower portion 12B remains with the frame of the house and helps provide a water-tight seal to protect the wood from any effects of rusting or corrosion of the shaft of the anchor bolt.

Applicant has developed a novel solution that solves the problems encountered in the incorrect installation of the concrete anchor bolts. Applicant has developed a plastic anchor cap that aligns the anchor bolt horizontally with respect to the edge of the sole plate, vertically with respect to the proper height, and axially with respect to the vertical plane. The plastic anchor cap attachment has the following features:

1. The plastic anchor cap is typically manufactured in a bright orange hard plastic material;
2. The plastic anchor cap has two tabs on opposite ends, so that it can be applied to either a 2×4 or a 2×6 sole plate.
3. By slipping the plastic anchor cap into the steel anchor bolt completely, the proper depth setting can be accomplished when the assembled anchor bolt is installed correctly in the freshly poured concrete.
4. When the assembled anchor bolt is correctly embedded into the fresh concrete, and the edge of the plastic anchor cap is aligned properly with the edge of the concrete form, the central axis of the anchor bolt is automatically aligned with the long mid-center line of the sole plate. The anchor bolt is also automatically set to the proper depth (this setting gives sufficient depth for the sole plate (nominal 1½" depth), the round washer, and the ½" nut.
5. An additional benefit of using the plastic anchor cap is that the plastic material isolates the steel anchor bolt from the wooden sole plate. Thus, preventing the potential development of rust on the surface of the anchor bolt that could affect the integrity of the wooden sole plate.

For less than the cost of ¹⁄₁₀ of 1% of the total cost of the residential structure, the plastic anchor cap is a very inexpensive and effective method of framing. This method assures that the anchoring of the wood frame to a residential structure will be done correctly, and in accordance with nationally recognized building codes. Also, the labor involved in the installation is minimal.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

What is claimed is:

1. A protection device for foundation anchor bolts, the protective device comprising:

a crown dimensioned to enclose the exposed portion of the anchor bolt;

legs, said legs depending from a base, said legs for assisting in maintaining the protective device on the foundation; and, the base joined to the crown with the longitudinal axis of the crown perpendicular to the base wherein the base and crown are made of plastic and the base has a first width of approximately 3½ inches and a second width of approximately 5½ inches.

\* \* \* \* \*